(12) United States Patent
Tamura et al.

(10) Patent No.: US 12,116,019 B2
(45) Date of Patent: Oct. 15, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Sho Tamura, Wako (JP); Takao Tamura, Wako (JP); Daichi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 227 days.

(21) Appl. No.: 17/674,941

(22) Filed: Feb. 18, 2022

(65) Prior Publication Data
US 2022/0315044 A1    Oct. 6, 2022

(30) Foreign Application Priority Data

Mar. 31, 2021    (JP) .................................. 2021-061935

(51) Int. Cl.
*B60W 60/00*    (2020.01)
*G06V 10/98*    (2022.01)
*G06V 20/56*    (2022.01)

(52) U.S. Cl.
CPC ........... *B60W 60/005* (2020.02); *G06V 10/98* (2022.01); *G06V 20/588* (2022.01);
(Continued)

(58) Field of Classification Search
CPC .............................. B60W 60/005; G06V 10/98
See application file for complete search history.

(56) References Cited

U.S. PATENT DOCUMENTS

2015/0248588 A1*  9/2015  Ishigami .................. G06T 7/60
                                                         382/104
2018/0107216 A1*  4/2018  Beaurepaire ....... G06Q 30/0261
(Continued)

FOREIGN PATENT DOCUMENTS

JP    2013-097714    5/2013
JP    2017-146724    8/2017
(Continued)

OTHER PUBLICATIONS

Japanese Office Action for Japanese Patent Application No. 2022-208579 mailed Oct. 31, 2023.
(Continued)

*Primary Examiner* — Jelani A Smith
*Assistant Examiner* — Toya Pettiegrew
(74) *Attorney, Agent, or Firm* — Amin, Turocy & Watson, LLP

(57) ABSTRACT

A vehicle control device recognizes a surrounding situation of a vehicle, controls steering and acceleration/deceleration of the vehicle without depending on an operation of a driver, determines any one of a plurality of driving modes including a first driving mode and a second driving mode as a driving mode of the vehicle, changes the driving mode of the vehicle to a driving mode in which the task is heavier when a task is not executed by the driver, determines whether there is an error in the map information and determines whether there is a recognition error, and when an error is determined in the map information, there is a recognition error while the vehicle is traveling in the second driving mode, and a preceding vehicle is recognized within a first predetermined distance, sets a travel continuation distance in the second driving mode to be longer.

17 Claims, 9 Drawing Sheets

(52) U.S. Cl.
CPC . *B60W 2420/403* (2013.01); *B60W 2420/408* (2024.01); *B60W 2530/201* (2020.02); *B60W 2552/53* (2020.02); *B60W 2554/802* (2020.02); *B60W 2556/40* (2020.02); *B60W 2710/20* (2013.01); *B60W 2720/106* (2013.01)

(56) References Cited

U.S. PATENT DOCUMENTS

| | | | |
|---|---|---|---|
| 2019/0184990 A1* | 6/2019 | Lee | B60W 30/143 |
| 2021/0001877 A1* | 1/2021 | Han | B60W 60/001 |
| 2021/0094574 A1* | 4/2021 | Lee | B60W 60/0015 |
| 2021/0146962 A1 | 5/2021 | Kaji et al. | |
| 2021/0349463 A1* | 11/2021 | Kurotobi | G05D 1/0214 |
| 2022/0204027 A1 | 6/2022 | Hitakatsu et al. | |
| 2022/0315043 A1 | 10/2022 | Tamura et al. | |
| 2023/0205533 A1* | 6/2023 | Agam | G06F 9/3802 |
| | | | 712/220 |

FOREIGN PATENT DOCUMENTS

| | | |
|---|---|---|
| JP | 2018-045500 | 3/2018 |
| JP | 2018-189900 | 11/2018 |
| JP | 2019-038396 | 3/2019 |
| JP | 2020-050086 | 4/2020 |
| JP | 2021-123262 | 8/2021 |
| JP | 2022-103505 | 7/2022 |
| JP | 2022-156557 | 10/2022 |
| WO | 2018/220826 | 12/2018 |

OTHER PUBLICATIONS

Japanese Notice of Allowance for Japanese Patent Application No. 2021-061935 mailed Nov. 29, 2022.

* cited by examiner

FIG. 2

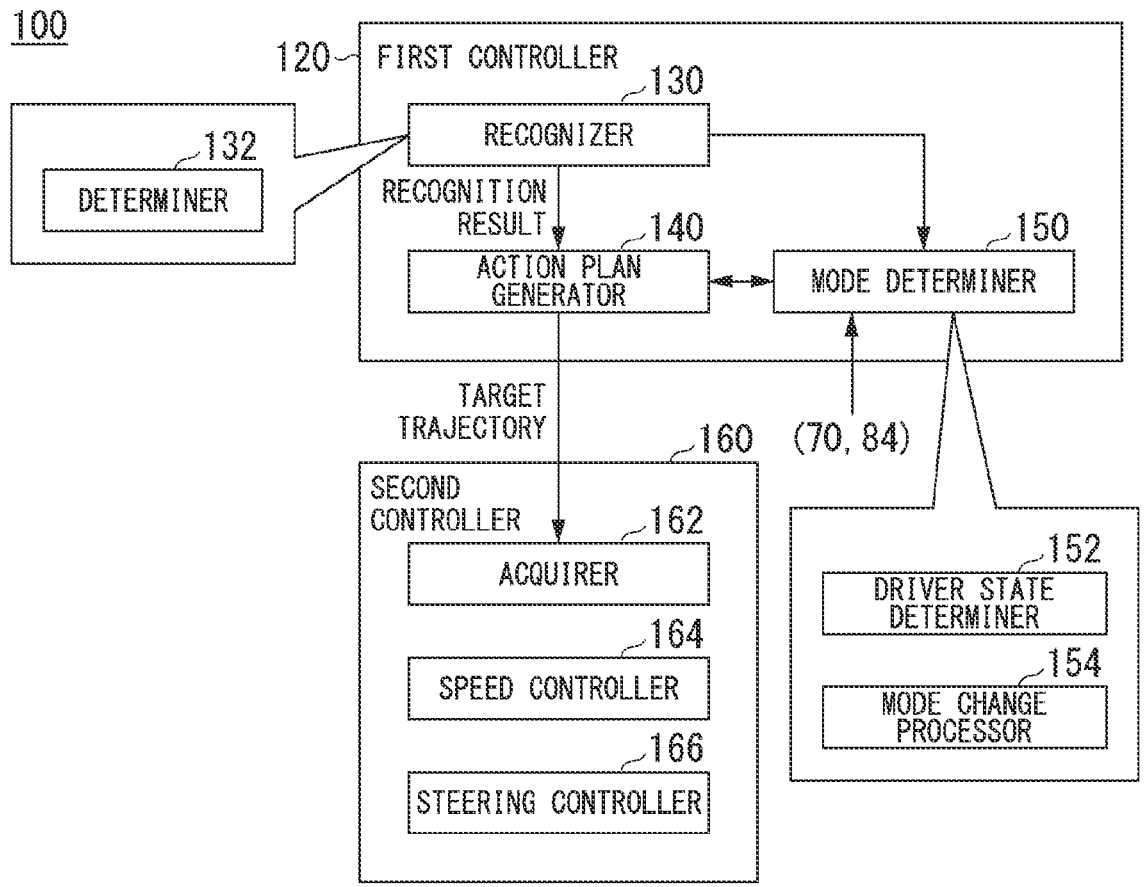

FIG. 3

| DRIVING MODE | CONTROL STATE | TASK | |
|---|---|---|---|
| MODE A | AUTOMATED DRIVING | FRONT MONITORING: UNNECESSARY STEERING GRIP: UNNECESSARY | ↑ TASK: LIGHT |
| MODE B | DRIVING SUPPORT | FRONT MONITORING: NECESSARY STEERING GRIP: UNNECESSARY | |
| MODE C | DRIVING SUPPORT | FRONT MONITORING: NECESSARY STEERING GRIP: NECESSARY | |
| MODE D | DRIVING SUPPORT | FRONT MONITORING: NECESSARY AT LEAST CERTAIN DEGREE OF DRIVING OPERATION IS NECESSARY | |
| MODE E | MANUAL DRIVING | FRONT MONITORING: NECESSARY DRIVING OPERATION AS WELL AS STEERING AND ACCELERATION/DECELERATION IS NECESSARY | ↓ TASK: HEAVY |

FIG. 7

| RECOGNITION ERROR PATTERN OF CAMERA LANE MARKS ON BOTH SIDES | (a) 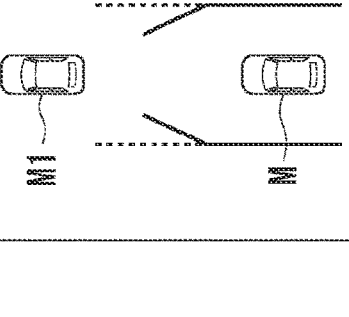 | (b) 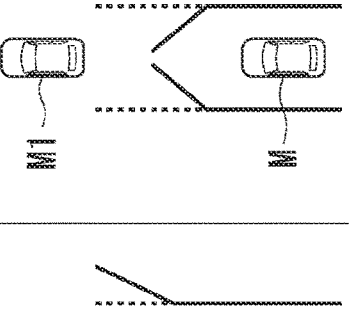 | (c) 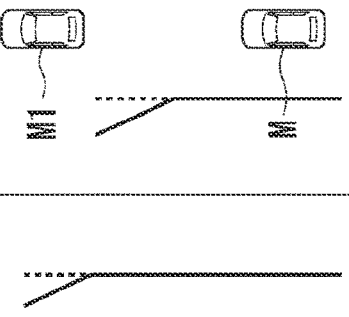 | (d) 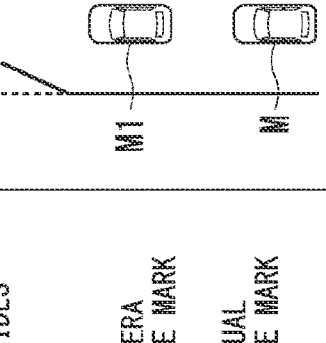 |
|---|---|---|---|---|
| POSITION OF CAMERA LANE MARK | FRONT SIDE OF PRECEDING VEHICLE | REAR SIDE OF PRECEDING VEHICLE | REAR SIDE OF PRECEDING VEHICLE | FRONT SIDE OF PRECEDING VEHICLE |
| DEVIATION DIRECTION OF CAMERA LANE MARK | — | OUTER SIDE | INNER SIDE OR SAME DIRECTION | INNER SIDE OR SAME DIRECTION |
| WIDTH OF CAMERA LANE MARK | — | — | — | LARGER THAN VEHICLE WIDTH |
| TRAVEL CONTINUATION DISTANCE IN MODE B | FIRST CONTINUATION DISTANCE | FIRST CONTINUATION DISTANCE | SECOND CONTINUATION DISTANCE | FIRST CONTINUATION DISTANCE |
| CORRESPONDING RECOGNITION ERROR PATTERN ON ONE SIDE | 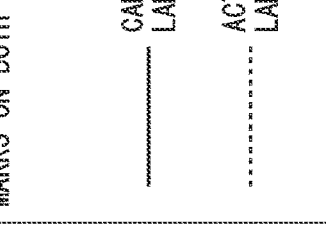 |  |  |  |

——— CAMERA LANE MARK
- - - - ACTUAL LANE MARK

FIG. 8

| RECOGNITION ERROR PATTERN OF CAMERA LANE MARKS ON BOTH SIDES | (e) | (f) | (g) | (h) |
|---|---|---|---|---|
| POSITION OF CAMERA LANE MARK | SECOND PREDETERMINED DISTANCE D2 OR MORE | LESS THAN SECOND PREDETERMINED DISTANCE D2 | LESS THAN SECOND PREDETERMINED DISTANCE D2 | LESS THAN SECOND PREDETERMINED DISTANCE D2 |
| DEVIATION DIRECTION OF CAMERA LANE MARK | — | OUTER SIDE | INNER SIDE OR SAME DIRECTION | INNER SIDE OR SAME DIRECTION |
| WIDTH OF CAMERA LANE MARK | — | — | — | LARGER THAN VEHICLE WIDTH |
| TRAVEL CONTINUATION DISTANCE IN MODE B | THIRD CONTINUATION DISTANCE | THIRD CONTINUATION DISTANCE | ZERO (END MODE B) | THIRD CONTINUATION DISTANCE |
| CORRESPONDING RECOGNITION ERROR PATTERN ON ONE SIDE | | | | |

——— CAMERA LANE MARK
----- ACTUAL LANE MARK

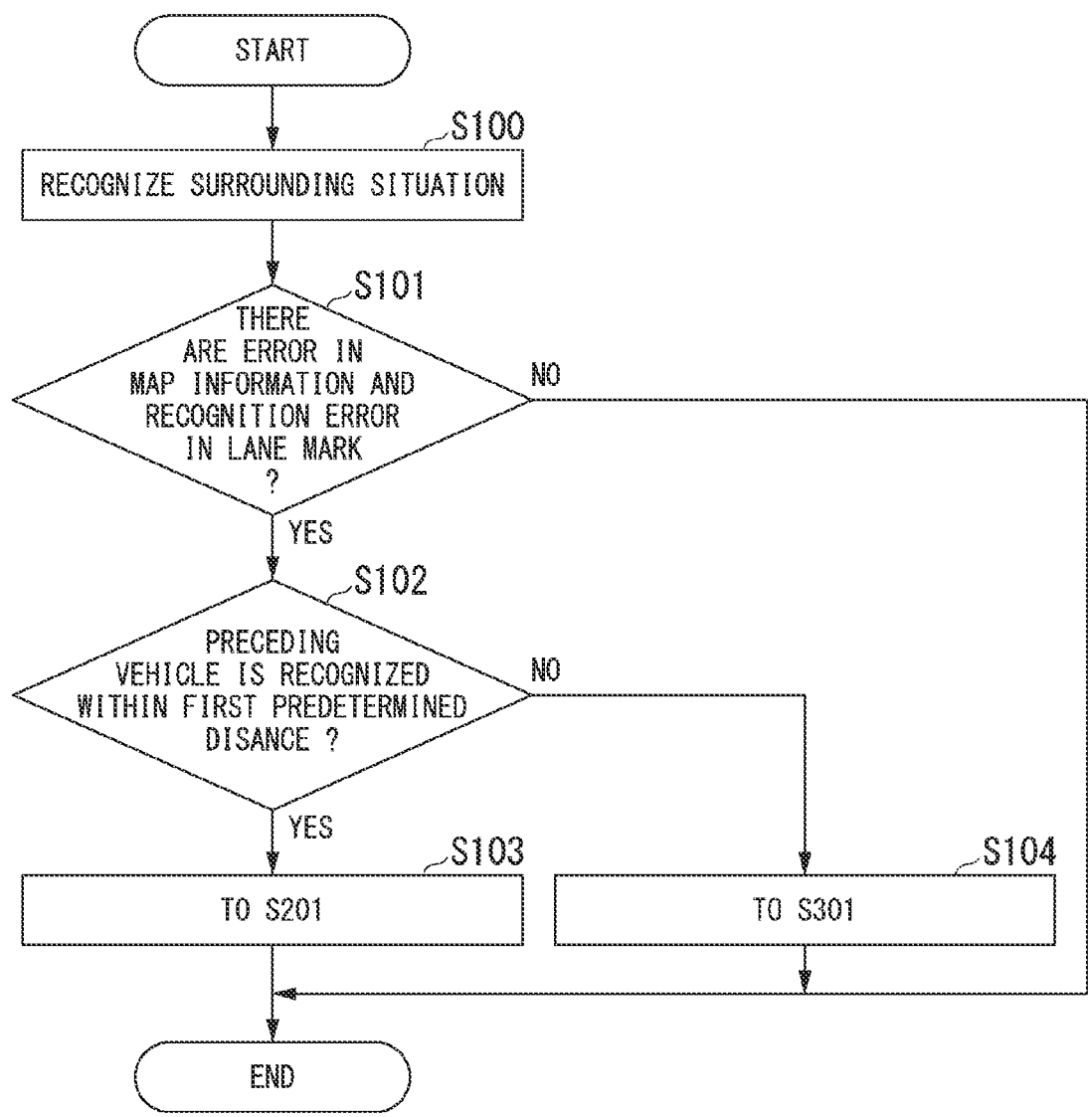

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2021-061935, filed on Mar. 31, 2021, the contents of which are hereby incorporated by reference into the present application.

BACKGROUND

Field of the Invention

The present invention relates to a vehicle control device, a vehicle control method, and a storage medium.

Description of Related Art

Techniques for changing a mode of vehicle driving control are known. For example, Unexamined Patent Application, First Publication discloses a technique for changing driving control based on a lane mark to another driving control mode when it is difficult to continuously recognize a lane mark of the road.

SUMMARY

However, in the conventional technology, when the map information mounted in the vehicle and the recognized external information are different, the driving control may not be flexibly changed.

The present invention has been made in view of such circumstances, and one object thereof is to provide a vehicle control device, a vehicle control method, and a storage medium capable of flexibly changing driving control even when map information mounted in a vehicle is different from recognized external information.

The vehicle control device according to the present invention has the following configuration.

(1) A vehicle control device according to an aspect of the present invention includes: a storage device that stores a program; and a hardware processor, wherein the hardware processor executes the program stored in the storage device to execute: recognizing a surrounding situation of a vehicle; controlling steering and acceleration/deceleration of the vehicle without depending on an operation of a driver of the vehicle based on the surrounding situation and map information; determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle; determining whether there is an error in the map information based on the surrounding situation and the map information and determining whether there is a recognition error in a lane mark included in the surrounding situation; and when it is determined that there is an error in the map information and there is a recognition error in the lane mark while the vehicle is traveling in the second driving mode, and a preceding vehicle is recognized within a first predetermined distance on a traveling direction side of the vehicle, setting a travel continuation distance in the second driving mode to be longer than that when the preceding vehicle is not recognized.

(2) In aspect (1), the hardware processor executes: comparing lane mark information in the map information with the lane mark and determining whether there is a recognition error in the lane mark based on at least one of a degree of parallelism of the lane mark and a traveling trajectory of the preceding vehicle when the lane mark information does not match the lane mark.

(3) In aspect (1), the hardware processor executes: determining whether there is a recognition error in lane marks on both sides of the vehicle or there is a recognition error in a lane mark on one side of the vehicle when it is determined that there is a recognition error in the lane mark.

(4) In aspect (3), the hardware processor executes: when it is determined that there is a recognition error in the lane mark and a preceding vehicle within a first predetermined distance on the traveling direction side of the vehicle is recognized, determining whether there is a recognition error in lane marks on both sides of the vehicle or there is a recognition error in a lane mark on one side of the vehicle based on a degree of parallelism between the lane mark and a traveling trajectory of the preceding vehicle.

(5) In aspect (3), the hardware processor executes: when it is determined that there is a recognition error in the lane mark, determining whether the lane marks on both sides or the lane mark on one side deviate(s) toward an outer side or an inner side with respect to a traveling direction of the vehicle or deviate(s) in the same direction as the traveling direction.

(6) In aspect (1), the hardware processor executes: when it is determined that there is a recognition error in the lane mark and a preceding vehicle within a first predetermined distance on a traveling direction side of the vehicle is recognized, determining whether the lane mark extends from a position of the vehicle to a front side of the preceding vehicle.

(7) In aspect (1), the hardware processor executes: when it is determined that there is a recognition error in the lane mark and a preceding vehicle within a first predetermined distance on a traveling direction side of the vehicle is not recognized, determining whether the lane mark has a length of a second predetermined distance or more from the vehicle in a traveling direction of the vehicle.

(8) In aspect (1), the hardware processor executes: when it is determined that there is a recognition error in the lane mark while the vehicle is traveling in the second driving mode and a preceding vehicle within a first predetermined distance on a traveling direction side of the vehicle is recognized, causing the vehicle to follow the preceding vehicle based on a traveling trajectory of the preceding vehicle.

(9) In aspect (6), the hardware processor executes: when it is determined that there is an error in the map information and there is a recognition error in the lane mark, a preceding vehicle within a first predetermined distance in a traveling direction side of the vehicle is recognized, and it is determined that the lane mark extends from a position of the vehicle to a front side of the preceding vehicle, setting a travel continuation distance in the second driving mode to a first continuation distance.

(10) In aspect (7), the hardware processor executes: when it is determined that there is an error in the map information and there is a recognition error in the lane mark, a preceding vehicle within a first predetermined distance in a traveling direction side of the vehicle is recognized, it is determined that the lane mark does not extend from a position of the vehicle to a front side of the preceding vehicle, and it is determined that the lane mark deviates toward an outer side, setting a travel continuation distance in the second driving mode to a first continuation distance.

(11) In aspect (7), the hardware processor executes: when it is determined that there is an error in the map information and there is a recognition error in the lane mark, a preceding vehicle within a first predetermined distance in a traveling direction side of the vehicle is recognized, it is determined that the lane mark does not extend from a position of the vehicle to a front side of the preceding vehicle, and it is determined that the lane mark deviates toward an inner side or deviates in the same direction, setting a travel continuation distance in the second driving mode to a second continuation distance.

(12) In aspect (11), the hardware processor executes: when it is determined that there is an error in the map information and there is a recognition error in the lane mark, a preceding vehicle within a first predetermined distance in a traveling direction side of the vehicle is recognized, it is determined that the lane mark does not extend from a position of the vehicle to a front side of the preceding vehicle, and it is determined that the lane mark deviates toward an inner side or deviates in the same direction, determining whether a width of the lane mark is larger than a vehicle width of the vehicle and setting a travel continuation distance in the second driving mode to a first continuation distance when it is determined that the width is larger than the vehicle width.

(13) In aspect (7), the hardware processor executes: when it is determined that there is an error in the map information and there is a recognition error in the lane mark, a preceding vehicle within a first predetermined distance in a traveling direction side of the vehicle is not recognized, and it is determined that the lane mark has a length of the second predetermined distance or more from the vehicle, setting a travel continuation distance in the second driving mode to a third continuation distance in a traveling direction of the vehicle.

(14) In aspect (7), the hardware processor executes: when it is determined that there is an error in the map information and there is a recognition error in the lane mark, a preceding vehicle within a first predetermined distance in a traveling direction side of the vehicle is not recognized, it is determined that the lane mark does not have a length of the second predetermined distance or more from the vehicle, and it is determined that the lane mark deviates toward an outer side, setting a travel continuation distance in the second driving mode to a third continuation distance in a traveling direction of the vehicle.

(15) In aspect (7), the hardware processor executes: when it is determined that there is an error in the map information and there is a recognition error in the lane mark, a preceding vehicle within a first predetermined distance in a traveling direction side of the vehicle is not recognized, it is determined that the lane mark does not have a length of the second predetermined distance or more from the vehicle, and it is determined that the lane mark deviates toward an inner side or in the same direction, setting a travel continuation distance in the second driving mode to a first continuation distance in a traveling direction of the vehicle.

(16) In aspect (15), the hardware processor executes: when it is determined that there is an error in the map information and there is a recognition error in the lane mark, a preceding vehicle within a first predetermined distance in a traveling direction side of the vehicle is not recognized, it is determined that the lane mark does not have a length of the second predetermined distance or more from the vehicle, and it is determined that the lane mark deviates toward an inner side or in the same direction, determining whether a width of the lane mark is larger than a vehicle width of the vehicle, and setting a travel continuation distance in the second driving mode to a third continuation distance when it is determined that the width is larger than the vehicle width in a traveling direction of the vehicle.

(17) A vehicle control method according to another aspect of the present invention causes a computer to execute: recognizing a surrounding situation of a vehicle; controlling steering and acceleration/deceleration of the vehicle without depending on an operation of a driver of the vehicle based on the surrounding situation and map information; determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle; determining whether there is an error in the map information based on the surrounding situation and the map information and determining whether there is a recognition error in a lane mark included in the surrounding situation; and when it is determined that there is an error in the map information and there is a recognition error in the lane mark while the vehicle is traveling in the second driving mode, and a preceding vehicle is recognized within a first predetermined distance on a traveling direction side of the vehicle, setting a travel continuation distance in the second driving mode to be longer than that when the preceding vehicle is not recognized.

(18) A computer-readable non-transitory storage medium according to another aspect of the present invention stores a program for causing a computer to execute: recognizing a surrounding situation of a vehicle; controlling steering and acceleration/deceleration of the vehicle without depending on an operation of a driver of the vehicle based on the surrounding situation and map information; determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle; determining whether there is an error in the map information based on the surrounding situation and the map information and determining whether there is a recognition error in a lane mark included in the surrounding situation; and when it is determined that there is an error in the map information and there is a recognition error in the lane mark while the vehicle is traveling in the second driving mode, and a preceding vehicle is recognized within a first predetermined distance on a traveling direction side of the vehicle, setting a travel continuation distance in the second driving mode to be longer than that when the preceding vehicle is not recognized.

According to aspects (1) to (18), it is possible to flexibly change the driving control even when the map information mounted in the vehicle is different from the recognized external information.

BRIEF DESCRIPTION OF THE DRAWINGS

FIG. 2 is a diagram illustrating a functional configuration of a first controller and a second controller.

FIG. 3 is a diagram illustrating an example of a correspondence relationship between a driving mode, a control state of a host vehicle, and a task.

FIG. 7 is a diagram for explaining a method in which an action plan generator sets a travel continuation distance in a driving mode of mode B when a recognizer has recognized a preceding vehicle.

FIG. 8 is a diagram for explaining a method in which the action plan generator sets a travel continuation distance in a driving mode of mode B when the recognizer has not recognized the preceding vehicle.

FIG. 9 is a flowchart showing an example of the flow of operations executed by the vehicle control device according to the present embodiment.

DESCRIPTION OF EMBODIMENTS

Hereinafter, embodiments of a vehicle control device, a vehicle control method, and a storage medium of the present invention will be described with reference to the drawings.
[Overall Configuration]

Figure 1:
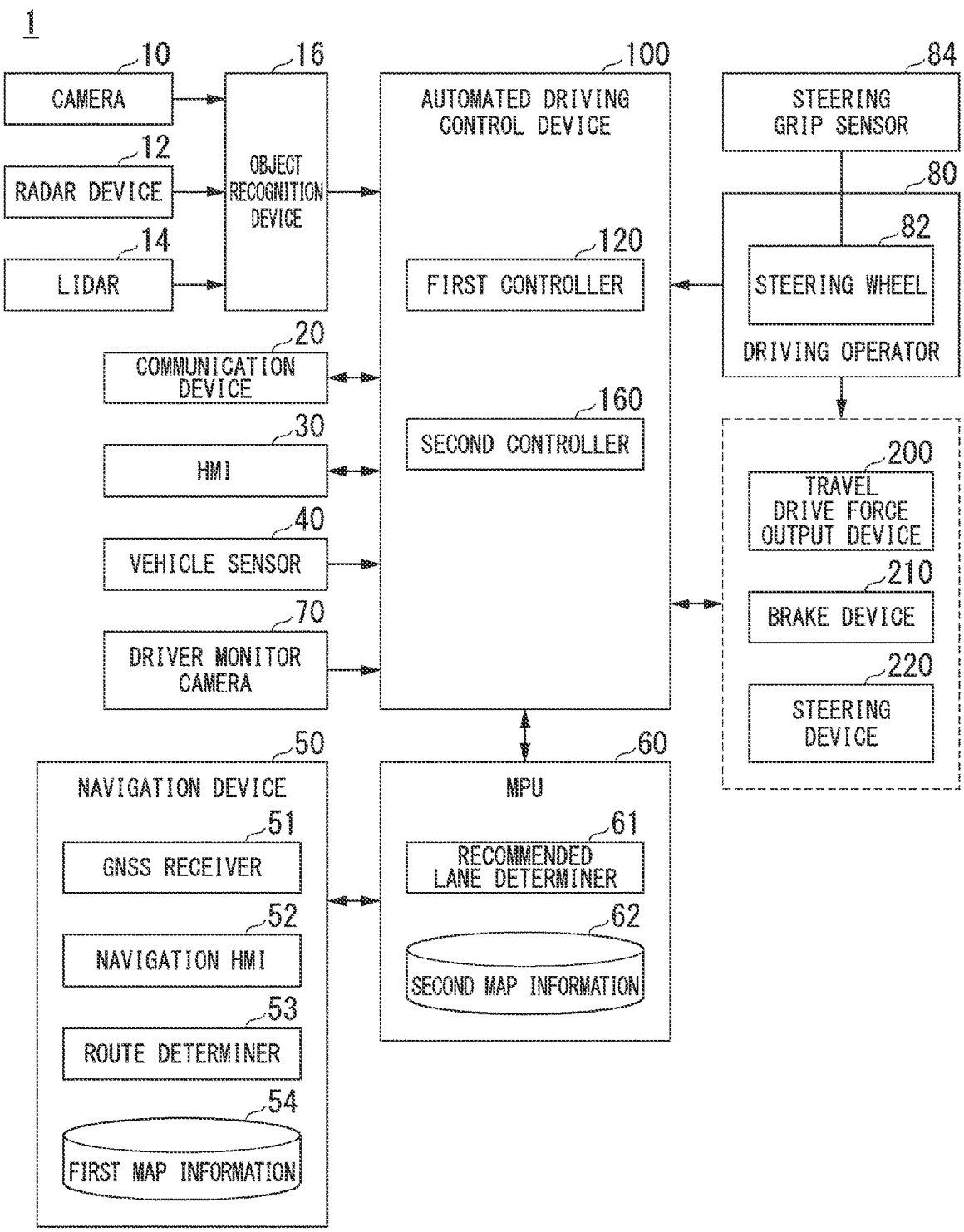
FIG. 1 is a block diagram of a vehicle system using a vehicle control device according to an embodiment.

FIG. 1 is a block diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. An electric motor operates using electric power generated by a generator connected to an internal combustion engine or electric power discharged by secondary batteries or fuel-cell batteries.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving control device 100, a travel drive force output device 200, a brake device 210, and a steering device 220. These apparatuses and devices are connected to each other by a multiplex communication line such as a controller area network (CAN) communication line, a serial communication line, a wireless communication network, and the like. Moreover, the components illustrated in FIG. 1 are examples only, some components may be omitted and other components may be added.

The camera 10 is, for example, a digital camera which uses a solid-state imaging device such as a charge coupled device (CCD) or a complementary metal oxide semiconductor (CMOS). The camera 10 is attached to an arbitrary position of a vehicle (hereinafter referred to as a host vehicle M) in which the vehicle system 1 is mounted. When capturing images on the front side, the camera 10 is attached to an upper part of a front windshield or a back surface of a rear-view mirror. The camera 10, for example, captures the images around the host vehicle M repeatedly and periodically. The camera 10 may be a stereo camera.

The radar device 12 emits radio waves such as millimeter waves to the surroundings of the host vehicle M and detects radio waves (reflected waves) reflected from an object to detect at least the position (the distance and direction) of the object. The radar device 12 is attached to an arbitrary position of the host vehicle M. The radar device 12 may detect the position and the speed of an object according to a frequency modulated continuous wave (FM-CW) method.

The LIDAR 14 irradiates the periphery of the host vehicle M with light (or an electromagnetic wave having a wavelength close to that of light) and measures the scattered light. The LIDAR 14 detects the distance to an object on the basis of the time taken to receive light after the light was emitted. The radiated light is pulsating laser light, for example. The LIDAR 14 is attached to an arbitrary position on the host vehicle M.

The object recognition device 16 performs sensor fusion processing on detection results obtained by some or all of the camera 10, the radar device 12, and the LIDAR 14 to recognize the position, the kind, the speed, and the like of an object. The object recognition device 16 outputs the recognition results to the automated driving control device 100. The object recognition device 16 may output the detection results obtained by the camera 10, the radar device 12, and the LIDAR 14 to the automated driving control device 100 as they are. The object recognition device 16 may be omitted from the vehicle system 1.

The communication device 20, for example, communicates with other vehicles present around the host vehicle M, or communicates with various server apparatuses via a wireless base station using a cellular network, a Wi-Fi network, Bluetooth (registered trademark), a dedicated short range communication (DSRC), or the like.

The HMI 30 presents various pieces of information to the occupant of the host vehicle M, and accepts input operations by the occupant. The HMI 30 includes, for example, various displays, speakers, microphones, buzzers, touch panels, switches, keys, and the like.

The vehicle sensor 40 includes a vehicle speed sensor that detects the speed of the host vehicle M, an acceleration sensor that detects the acceleration, a yaw-rate sensor that detects the angular velocity around the vertical axis, an azimuth sensor that detects the direction of the host vehicle M, and the like.

The navigation device 50 includes, for example, a global navigation satellite system (GNSS) receiver 51, a navigation HMI 52, and a route determiner 53. The navigation device 50 holds the first map information 54 in a storage device such as a hard disk drive (HDD) or a flash memory. The GNSS receiver 51 specifies the position of the host vehicle M on the basis of signals received from GNSS satellites. The position of the host vehicle M may be specified or complemented by an inertial navigation system (INS) which uses the output of the vehicle sensor 40. The navigation HMI 52 includes a display, a speaker, a touch panel, keys, and the like. The navigation HMI 52 may be partially or entirely shared with the HMI 30. For example, the route determiner 53 determines a route (hereinafter a map route) from the position (or an input arbitrary position) of the host vehicle M specified by the GNSS receiver 51 to a destination input by an occupant using the navigation HMI 52 by referring to the first map information 54. The first map information 54 is information in which a road shape is represented by links indicating roads and nodes connected by links. The first map information 54 may include the curvature of a road, point of interest (POI) information, and the like.

The map route is output to the MPU 60. The navigation device 50 may perform route guidance using the navigation HMI 52 on the basis of the map route. The navigation device 50 may be realized by the functions of a terminal device such as a smartphone or a tablet terminal held by an occupant. The navigation device 50 may transmit a present position and a destination to a navigation server via the communication device 20 and acquire a route equivalent to a map route from the navigation server.

The MPU 60 includes a recommended lane determiner 61, for example, and stores second map information 62 in a storage device such as a HDD or a flash memory. The recommended lane determiner 61 divides the map route provided from the navigation device 50 into a plurality of blocks (for example, the route may be partitioned every 100 [m] in relation to a vehicle traveling direction) and determines a recommended lane for each block by referring to the second map information 62. The recommended lane determiner 61 determines that the vehicle is traveling in a certain lane from the left.

When a branching point is present on a map route, the recommended lane determiner 61 determines a recommended lane so that the host vehicle M can travel along a reasonable route for proceeding to a branch destination.

The second map information 62 is more accurate map information than the first map information 54. The second map information 62 includes, for example, information on the center of the lane or information on the boundary of the lane. The second map information 62 may include road information, traffic regulation information, address information (address and postal codes), facility information, telephone number information, and information on a prohibited segment in which mode A or mode B described later is prohibited. The second map information 62 may be updated as necessary by the communication device 20 communicating with other devices.

The driver monitor camera 70 is, for example, a digital camera that uses a solid-state image sensor such as a CCD or CMOS. The driver monitor camera 70 is attached to, for example, an arbitrary portion of the host vehicle M in a position and direction in which the head of an occupant (hereinafter referred to as a driver) seated in the driver's seat of the host vehicle M can be imaged from the front (in the direction in which the face is imaged). For example, the driver monitor camera 70 is attached to the upper part of the display provided in the central portion of the instrument panel of the host vehicle M.

The driving operator 80 includes, for example, an acceleration pedal, a brake pedal, a shift lever, and other operators in addition to the steering wheel 82. Sensors that detect an amount of operation or the presence of an operation are attached to the driving operator 80, and the detection results are output to some or all of the automated driving control device 100 or the travel drive force output device 200, the brake device 210, and the steering device 220. The steering wheel 82 is an example of an "operator that accepts a steering operation by the driver". The operator does not necessarily have to be circular, and may be in the form of a deformed steering wheel, a joystick, a button, or the like. A steering grip sensor 84 is attached to the steering wheel 82. The steering grip sensor 84 is realized by a capacitance sensor or the like, and outputs a signal capable of detecting whether the driver is gripping the steering wheel 82 (meaning that the steering wheel 82 is in contact with force applied thereto) to the automated driving control device 100.

The automated driving control device 100 includes, for example, a first controller 120 and a second controller 160. The first controller 120 and the second controller 160 each are realized when a hardware processor such as a central processing unit (CPU) or the like executes a program (software). Some or all of these components may be realized by hardware (a circuit portion; including circuitry) such as large scale integration (LSI), an application specific integrated circuit (ASIC), a field-programmable gate array (FPGA), or a graphics processing unit (GPU) and may be realized by the cooperation of software and hardware. The program may be stored in advance in a storage device (a storage device including a non-transitory storage medium) such as a HDD or a flash memory of the automated driving control device 100 and may be stored in a removable storage medium such as a DVD or a CD-ROM and be installed in a HDD or a flash memory of the automated driving control device 100 when a storage medium (a non-transitory storage medium) is attached to a drive device. The automated driving control device 100 is an example of the "vehicle control device", and a combination of the action plan generator 140 and the second controller 160 is an example of the "driving controller".

FIG. 2 is a diagram illustrating a functional configuration of the first controller 120 and the second controller 160. The first controller 120 includes, for example, a recognizer 130, an action plan generator 140, and a mode determiner 150. For example, the first controller 120 realizes the functions of artificial intelligence (AI) and the functions of a predetermined model in parallel. For example, a function of "recognizing an intersection" may be realized by executing recognition of an intersection by deep learning and the like and recognition based on a predetermined condition (signals, lane marks, and the like which can be subjected to pattern matching) in parallel and scoring both recognition results to make comprehensive evaluation. In this way, the reliability of automated driving is secured.

The recognizer 130 recognizes the position and the state such as speed and acceleration of objects around the host vehicle M based on the information input from the camera 10, the radar device 12, and the LIDAR 14 via the object recognition device 16. The object position is recognized as the position on an absolute coordinate system in which a representative point (the center of gravity, the center of a driving shaft, or the like) of the host vehicle M is at the origin, for example, and is used for control. The object position may be represented by a representative point such as the center of gravity or a corner of the object and may be represented by a region. The "state" of an object may include the acceleration or a jerk of an object or an "action state" (for example, whether the object has changed or is trying to change lanes).

For example, the recognizer 130 recognizes a lane (a traveling lane) in which the host vehicle M is traveling. For example, the recognizer 130 recognizes the traveling lane by comparing a pattern (for example, an arrangement of solid lines and broken lines) of lane marks obtained from the second map information 62 and a pattern of lane marks around the host vehicle M recognized from the images captured by the camera 10. The recognizer 130 may recognize the traveling lane by recognizing runway boundaries (road boundaries) including lane marks, road shoulders, curbs, a median strip, guard rails, and the like without being limited to the lane marks. In this recognition, the position of the host vehicle M acquired from the navigation device 50 and the processing results of the INS may be also taken into consideration. The recognizer 130 recognizes a temporary stop line, an obstacle, a red sign, a toll booth, and other road events.

When recognizing the traveling lane, the recognizer 130 recognizes the position and a direction of the host vehicle M in relation to the traveling lane. For example, the recognizer 130 may recognize an offset from a lane center of a reference point of the host vehicle M and an angle between the traveling direction of the host vehicle M and an extension line of the lane center as the relative position and the direction of the host vehicle M in relation to the traveling lane. Instead of this, the recognizer 130 may recognize the position or the like of the reference point of the host vehicle M in relation to any one of side ends (lane marks or road boundaries) of the traveling lane as the relative position of the host vehicle M in relation to the traveling lane. The recognizer 130 further includes a determiner 132, and the details of the determiner 132 will be described later.

In principle, the action plan generator 140 generates a target trajectory along which the host vehicle M travels in the future automatically (without depending on an operation of a driver) so that the host vehicle M travels in the recommended lane determined by the recommended lane determiner 61 and it is possible to cope with a surrounding situation of the host vehicle M. The target trajectory includes a speed element, for example. For example, the target trajectory is represented as an arrangement of positions (trajectory points) that the host vehicle M has to reach. The trajectory points are positions that the host vehicle M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the host vehicle M has to reach at respective sampling time points of the predetermined sampling periods. In this case, the information of the target speed and the target acceleration is represented by the intervals of the trajectory points.

The action plan generator 140 may set an automated driving event when generating the target trajectory. The automated driving event includes a constant speed travel event, a low-speed pilot travel event, a lane change event, a branching event, a merging event, a takeover event, and the like. The action plan generator 140 generates a target trajectory according to the activated event.

The mode determiner 150 determines any one of a plurality of driving modes in which the driver is assigned different tasks as the driving mode of the host vehicle M. The mode determiner 150 includes, for example, a driver state determiner 152 and a mode change processor 154. These individual functions will be described later.

FIG. 3 is a diagram illustrating an example of the correspondence relationship between the driving mode, the control state of the host vehicle M, and the task. The driving modes of the host vehicle M include, for example, five modes of mode A to mode E. The degree of automation of the control state, that is, the driving control of the host vehicle M, is highest in mode A, decreasing in the order of mode B, mode C, and mode D, and is lowest in mode E. On the other hand, the task assigned to the driver is lightest in mode A, becoming heavier in the order of mode B, mode C, and mode D, and is heaviest in mode E. In modes D and E, the control state is not automated driving. Therefore, the automated driving control device 100 is responsible for operations until ending control related to automated driving and shifting to driving support or manual driving. Hereinafter, the content of each driving mode will be illustrated.

In mode A, the vehicle is in an automated driving state, and the driver is not assigned any of the tasks of monitoring the front and gripping the steering wheel 82 (in the figure, "steering grip"). However, even in mode A, the driver is required to be in a posture to quickly shift to manual driving in response to a request from the system centered on the automated driving control device 100. The term "automated driving" as used herein means that both the steering and acceleration/deceleration of the host vehicle M are controlled without depending on the driver's operation. The front is the space in the traveling direction of the host vehicle M that is visually recognized through the front windshield. For example, when a condition that the host vehicle M is traveling at an upper-limit speed (for example, about 50 [km/h]) or less on an automobile-only road such as a highway, and a following target preceding vehicle is present is satisfied, mode A is a driving mode in which pilot travel of following a preceding vehicle can be executed and may be called a traffic jam pilot mode (TJP mode). When this condition is not satisfied, the mode determiner 150 changes the driving mode of the host vehicle M to mode B.

In mode B, the vehicle is in a driving support state, and the driver is assigned a task of monitoring the front of the host vehicle M (hereinafter, front monitoring), but is not assigned the task of gripping the steering wheel 82. Mode B is executed particularly when the host vehicle M is traveling at a speed equal to or higher than the upper limit speed at which the above-mentioned TJP is executed. In mode C, the vehicle is in a driving support state, and the driver is assigned a front monitoring task and a task of gripping the steering wheel 82. Mode D is a driving mode in which a certain degree of driving operation by the driver is required for at least one of steering and acceleration/deceleration of the host vehicle M. For example, in mode D, driving support such as adaptive cruise control (ACC) or lane keeping assist system (LKAS) is provided. In mode E, the vehicle is in a manual driving state in which the driving operation by the driver is required for steering and acceleration/deceleration. In both mode D and mode E, the driver is naturally assigned a task of monitoring the front of the host vehicle M.

The automated driving control device 100 (and a driving support device (not shown)) executes an automated lane change according to a driving mode. The automated lane change includes an automated lane change (1) according to a system request and an automated lane change (2) according to a driver request. The automated lane change (1) includes an automated lane change for passing another vehicle, performed when the speed of a preceding vehicle is slower than the speed of the host vehicle by a reference value or more and an automated lane change for proceeding to a destination (an automated lane change due to a change in a recommended lane). The automated lane change (2) involves changing the lane of the host vehicle M toward an operation direction when a direction indicator is operated by the driver when the conditions related to the speed and the positional relationship with a surrounding vehicle are satisfied.

In mode A, the automated driving control device 100 does not execute either of the automated lane changes (1) or (2). In modes B and C, the automated driving control device 100 executes both of the automated lane changes (1) and (2). In mode D, the driving support device (not shown) does not execute the automated lane change (1) but executes the automated lane change (2). In mode E, neither automated lane change (1) nor (2) is executed.

The mode determiner 150 changes the driving mode of the host vehicle M to a driving mode in which the task is heavier when the task related to the determined driving mode (hereinafter, a current driving mode) is not executed by the driver.

For example, in mode A, when the driver is in a posture where he/she cannot shift to manual driving in response to a request from the system (for example, when he/she continues to look outside the permissible area, or when a sign that driving becomes difficult is detected), the mode determiner 150 uses the HMI 30 to execute control for urging the driver to shift to the manual driving. When the driver does not respond, the mode determiner 150 performs control such that the host vehicle M is moved closer to a road shoulder and is gradually stopped, and the automated driving is stopped. After the automated driving is stopped, the host vehicle M is in mode D or E, and the host vehicle M can be started by the manual operation of the driver. Hereinafter, the same applies to "stopping of automated driving." In mode B, when the driver is not monitoring the front, the mode determiner 150 uses the HMI 30 to urge the driver to monitor the front, and performs control such that the host vehicle M is moved closer to a road shoulder and is gradually stopped, and the automated driving is stopped if the driver does not respond. If the driver is not monitoring the front in mode C, or is not gripping the steering wheel 82, the mode determiner 150 uses the HMI 30 to urge the driver to monitor the front and/or grip the steering wheel 82, and performs control such that the host vehicle M is moved closer to a road shoulder and is gradually stopped, and the automated driving is stopped if the driver does not respond.

The driver state determiner 152 monitors the driver's state in order to perform the mode change, and determines whether the driver's state is the state corresponding to the task. For example, the driver state determiner 152 analyzes the image captured by the driver monitor camera 70 to perform posture estimation processing, and determines whether the driver is in a position where he/she cannot shift to manual driving in response to a system request. Further, the driver state determiner 152 analyzes the image captured by the driver monitor camera 70 to perform line-of-sight estimation processing, and determines whether the driver is monitoring the front.

The mode change processor 154 performs various processes for changing the mode. For example, the mode change processor 154 instructs the action plan generator 140 to generate a target trajectory for stopping at a road shoulder, instructs a driving support device (not illustrated) to operate, and controls the HMI 30 in order to urge the driver to perform an action.

The second controller 160 controls the travel drive force output device 200, the brake device 210, and the steering device 220 so that the host vehicle M passes the target trajectory generated by the action plan generator 140 at the scheduled time.

Returning to FIG. 2, the second controller 160 includes, for example, an acquirer 162, a speed controller 164, and a steering controller 166. The acquirer 162 acquires information on the target trajectory (trajectory points) generated by the action plan generator 140 and stores the information in a memory (not illustrated). The speed controller 164 controls the travel drive force output device 200 or the brake device 210 on the basis of a speed element included in the target trajectory stored in the memory. The steering controller 166 controls the steering device 220 according to the degree of curving of the target trajectory stored in the memory. The processes of the speed controller 164 and the steering controller 166 are realized by a combination of feedforward control and feedback control, for example. As an example, the steering controller 166 executes feedforward control according to the curvature of a road in front of the host vehicle M and feedback control based on an offset from a target trajectory in combination.

The travel drive force output device 200 outputs a travel drive force (torque) for a vehicle to travel to driving wheels. The travel drive force output device 200 includes, for example, a combination of an internal combustion engine, an electric motor, and a transmission and an electronic controller (ECU) that controls these components. The ECU controls the above-mentioned components according to the information input from the second controller 160 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the second controller 160 or the information input from the driving operator 80 so that brake torque corresponding to a braking operation is output to each wheel. The brake device 210 may include a backup mechanism that delivers hydraulic pressure generated by an operation of a brake pedal included in the driving operator 80 to a cylinder via a master cylinder. The brake device 210 is not limited to the above-described configuration and may be an electrically-controlled hydraulic-pressure brake device that controls an actuator according to information input from the second controller 160 and delivers hydraulic pressure of the master cylinder to a cylinder.

The steering device 220 includes, for example, a steering ECU and an electric motor.

The electric motor, for example, applies a force to a rack-and-pinion mechanism to change the direction of a steering wheel. The steering ECU drives an electric motor according to the information input from the second controller 160 or the information input from the driving operator 80 to change the direction of the steering wheel.

[Operation]

Figure 4:
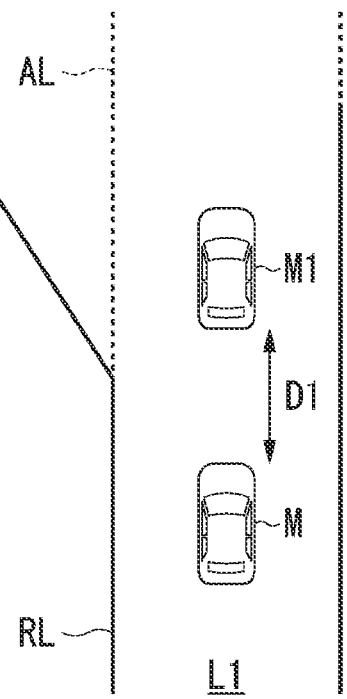
FIG. 4 is a diagram showing an example of a situation in which the operation of the vehicle control device according to the embodiment is executed.

Next, the operation of the vehicle control device according to the embodiment will be described. In the following description, it is assumed that the driving mode of the host vehicle M is mode B. FIG. 4 is a diagram showing an example of a situation in which the operation of the vehicle control device according to the embodiment is executed. In FIG. 4, the host vehicle M is traveling in the lane L1, and a preceding vehicle M1 is traveling in front of the host vehicle M. While the host vehicle M is traveling in the lane L1, the recognizer 130 recognizes the surrounding situation of the host vehicle M, particularly the lane marks RL on both sides of the host vehicle M. AL indicates the actual lane marks of the lane L1.

The determiner 132 determines whether there is an error in the second map information 62 based on the surrounding situation recognized by the recognizer 130 and the second map information 62. The determiner 132 determines that there is an error in the second map information 62, for example, when the surrounding situation recognized by the recognizer 130 indicates a lane, whereas the position of the host vehicle M indicated by the second map information 62 indicates a non-lane, and a deviation has occurred.

The determiner 132 further determines whether there is a recognition error in the lane mark RL included in the surrounding situation recognized by the recognizer 130. For example, the determiner 132 determines whether the recognized lane marks RL on both sides are parallel (that is, whether the angle between the extension lines of the lane marks RL on both sides is equal to or less than a threshold value). When the lane marks RL are not parallel, it is determined that there is a recognition error in the lane marks RL. Further, for example, the determiner 132 may determine that there is a recognition error in the lane mark RL when the trajectory vector of the central position of the preceding vehicle M1 is not parallel to the lane mark RL.

When it is determined that there is a recognition error in the lane mark RL, the determiner 132 determines whether there is a recognition error in the lane marks RL on both sides of the host vehicle M, or there is a recognition error in the lane mark RL on one side of the host vehicle M. Specifically, when the determiner 132 determines that there is a recognition error in the lane mark RL, and the recognizer 130 has recognized the preceding vehicle M1 within a first predetermined distance D1 (for example, several meters to several tens of meters) on the traveling direction side of the host vehicle M, the determiner 132 acquires the traveling trajectory MT of the preceding vehicle M1 from the recognizer 130 and determines whether there is a recognition error in the lane marks RL on both sides of the host vehicle M or there is a recognition error in the lane mark RL on one side of the host vehicle M based on a degree of parallelism between the lane mark RL and the traveling trajectory MT.

Figure 5:
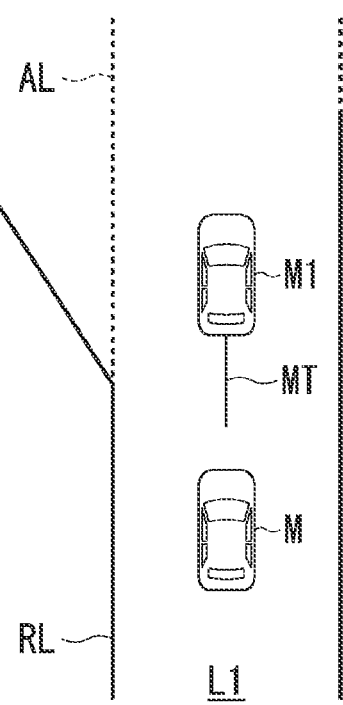
FIG. 5 is a diagram showing an example of a situation in which a determiner determines whether there is a recognition error in lane marks on both sides or there is a recognition error in a lane mark on one side.

FIG. 5 is a diagram showing an example of a situation in which the determiner 132 determines whether there is a recognition error in the lane marks RL on both sides or there is a recognition error in the lane mark RL on one side. As shown in FIG. 5, the determiner 132 compares the traveling trajectory MT acquired from the recognizer 130 with the lane mark RL on the left side and the lane mark RL on the right side with respect to the traveling direction of the host vehicle M. In the case of FIG. 5, the traveling trajectory MT and the lane mark RL on the right side are parallel, whereas the traveling trajectory MT and the lane mark RL on the left side are not parallel. Therefore, the determiner 132 determines that there is a recognition error in the lane mark RL on the left side, that is, the lane mark RL on one side.

When it is determined that there is a recognition error in the lane mark RL, the determiner 132 determines whether the lane marks RL on both sides or the lane mark RL on one side deviate(s) toward the outer side or the inner side with respect to the traveling direction of the host vehicle M or in the same direction as the traveling direction. Specifically, the determiner 132 acquires, for example, the width of the lane marks RL on both sides recognized by the recognizer 130, determines that the lane mark deviates toward the outer side when the width is increasing, determines that the lane mark deviates toward the inner side when the width is decreasing, and determines that the lane mark deviates in the same direction when the width is constant.

When it is determined that there is a recognition error in the lane mark RL and the recognizer 130 has recognized the preceding vehicle M1 within the first predetermined distance D1 on the traveling direction side of the host vehicle M, the determiner 132 further determines whether the lane mark RL recognized by the recognizer 130 extends from the position of the host vehicle M to the front side of the preceding vehicle M1. For example, in the case of FIG. 5, the lane mark RL recognized by the recognizer 130 extends from the position of the host vehicle M beyond the front end of the preceding vehicle M1. Therefore, the determiner 132 determines that the lane mark RL recognized by the recognizer 130 extends from the position of the host vehicle M to the front side of the preceding vehicle M1. After that, the action plan generator 140 generates a target trajectory that causes the host vehicle M to follow the preceding vehicle M1 in the driving mode of mode B based on the traveling trajectory MT of the preceding vehicle M1, and the second controller 160 causes the host vehicle M to travel along the generated target trajectory. At this time, the travel continuation distance for causing the host vehicle M to travel in the driving mode of mode B is set to a different value depending on whether the lane mark RL deviates toward the outer side or the inner side with respect to the traveling direction of the host vehicle M or deviates in the same direction as the traveling direction and whether the lane mark RL extends from the position of the host vehicle M to the front side of the preceding vehicle M1. The details thereof will be described later.

On the other hand, when it is determined that there is a recognition error in the lane mark RL and the recognizer 130 has not recognized the preceding vehicle M1 within the first predetermined distance D1 on the traveling direction side of the host vehicle M, the determiner 132 determines whether the lane mark RL has a length of a second predetermined distance D2 or more from the host vehicle M on the traveling direction side of the host vehicle M. The second predetermined distance D2 is, for example, a distance corresponding to an inter-vehicle time of several seconds, and is a distance required for the recognizer 130 to accurately recognize the lane mark RL present around the host vehicle M. Here, the inter-vehicle time means the time required for the host vehicle M to reach the current position of the preceding vehicle M1 from the current position, assuming that the host vehicle M travels at the current speed. In other words, the determiner 132 determines whether the lane mark RL has a length equal to or longer than the distance corresponding to the inter-vehicle time on the traveling direction side of the host vehicle M.

Figure 6:
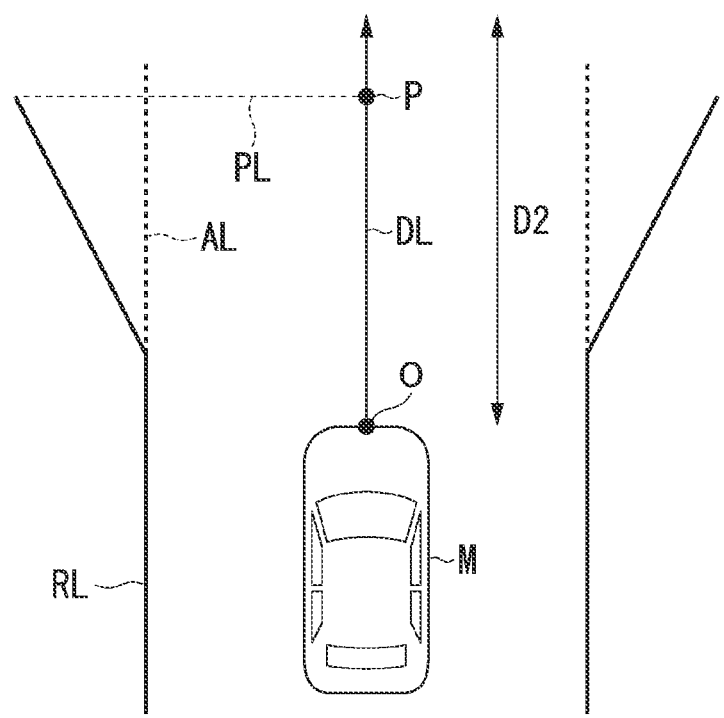
FIG. 6 is a diagram showing an example of a situation in which a determiner determines whether a lane mark has a length of a second predetermined distance or more from the host vehicle on a traveling direction side of the host vehicle.

FIG. 6 is a diagram showing an example of a situation in which the determiner 132 determines whether the lane mark RL has a length of the second predetermined distance D2 or more from the host vehicle M on the traveling direction side of the host vehicle M. In FIG. 6, DL indicates a line segment extending from the center O of the front end of the host vehicle M by the second predetermined distance D2 in the traveling direction, PL indicates a line segment of a perpendicular line drawn from the front end of the lane mark RL recognized by the recognizer 130 toward the line segment DL, and P indicates an intersection point between the line segment DL and the line segment PL. At this time, as shown in FIG. 6, the length of a line segment OP is smaller than the length D2 of the line segment DL. Therefore, the determiner 132 determines that the lane mark RL does not have a length of the second predetermined distance D2 or more from the host vehicle M on the traveling direction side of the host vehicle M.

[Setting of Travel Continuation Distance]

When the determiner 132 determines that there is an error in the second map information 62 and there is a recognition error in the lane mark RL when the host vehicle M is traveling in the driving mode of mode B, the action plan generator 140 determines the travel continuation distance of the host vehicle M in the driving mode of mode B based on the recognition result from the recognizer 130 and the determination result from the determiner 132 and generates a target trajectory corresponding to the travel continuation distance. At this time, in particular, when the recognizer 130 has recognized the preceding vehicle M1 within the first predetermined distance D1 on the traveling direction side of the host vehicle M, the action plan generator 140 sets the travel continuation distance in the driving mode of mode B to be longer than when the recognizer 130 has not recognized the preceding vehicle M1. Hereinafter, a method of setting the travel continuation distance in the driving mode of mode B will be described with reference to FIGS. 7 and 8.

FIG. 7 is a diagram for explaining a method in which the action plan generator 140 sets the travel continuation distance in the driving mode of mode B when the recognizer 130 has recognized the preceding vehicle M1.

As shown in FIG. 7, when the recognizer 130 has recognized the preceding vehicle M1, the method of setting the travel continuation distance is classified into four patterns according to the determination result from the determiner 132. In each pattern, the travel continuation distance is uniquely set regardless of whether there is a recognition error in the lane marks RL on both sides or there is a recognition error in the lane mark RL on one side. Therefore, the case where there is a recognition error in the lane marks RL on both sides and the case where there is a recognition error in the lane mark RL on one side will be described together.

[Pattern (a)]

In pattern (a) of FIG. 7, the action plan generator 140 sets the travel continuation distance of the host vehicle M in mode B to a first continuation distance when the determiner 132 determines that there is an error in the second map information 62 and there is a recognition error in the lane mark RL, the recognizer 130 has recognized the preceding vehicle within the first predetermined distance D1 on the traveling direction side of the host vehicle M, and the determiner 132 determines that the lane mark RL extends from the position of the host vehicle M to the front side of the preceding vehicle M1. The first continuation distance is the maximum value of the travel continuation distance and is, for example, several hundred meters.

This is because when the lane mark RL extends to the front side of the preceding vehicle M1, there is a margin in the length of the lane mark RL to be used for generating the target trajectory, and the action plan generator 140 can generate the target trajectory based on both the traveling trajectory MT of the preceding vehicle M1 and the lane mark RL.

[Pattern (b)]

In pattern (b) of FIG. 7, the action plan generator 140 sets the travel continuation distance of the host vehicle M in mode B to the first continuation distance when the determiner 132 determines that there is an error in the second map information 62 and there is a recognition error in the lane mark RL, the recognizer 130 has recognized the preceding vehicle M1 within the first predetermined distance D1 on the traveling direction side of the host vehicle M, the determiner 132 determines that the lane mark RL does not extend from the position of the host vehicle M to the front side of the preceding vehicle M1, and the determiner 132 determines that the lane mark RL deviates toward the outer side. This is because when the lane mark RL deviates toward the outer side, it is considered that there is no problem with the host vehicle M traveling in the driving mode of mode B even when the length of the recognized lane mark RL is short, and the target trajectory can be generated based on the traveling trajectory MT of the preceding vehicle M1.

[Pattern (c)]

In pattern (c) of FIG. 7, the action plan generator 140 sets the travel continuation distance of the host vehicle M in mode B to a second continuation distance when the determiner 132 determines that there is an error in the second map information 62 and there is a recognition error in the lane mark RL, the recognizer 130 has recognized the preceding vehicle M1 within the first predetermined distance D1 on the traveling direction side of the host vehicle M, the determiner 132 determines that the lane mark RL does not extend from the position of the host vehicle M to the front side of the preceding vehicle M1, and the determiner 132 determines that the lane mark RL deviates toward the inner side or in the same direction as the traveling direction. At this time, the second continuation distance is a value smaller than the first continuation distance, and is, for example, several tens of meters to several hundreds of meters. In the case of pattern (c), since the length of the recognized lane mark RL is short, and the width thereof is decreasing or is not changing, there may be a problem with the host vehicle M traveling continuously in the driving mode of mode B. Therefore, the action plan generator 140 generates a target trajectory so that the host vehicle M travels in the driving mode of mode B only for the second continuation distance shorter than the first continuation distance.

[Pattern (d)]

In pattern (d) of FIG. 7, the determiner 132 determines whether the width of the lane mark RL is larger than the vehicle width of the host vehicle M when the determiner 132 determines that there is an error in the second map information 62 and there is a recognition error in the lane mark RL, the recognizer 130 has recognized the preceding vehicle M1 within the first predetermined distance D1 on the traveling direction side of the host vehicle M, the determiner 132 determines that the lane mark RL does not extend from the position of the host vehicle M to the front side of the preceding vehicle M1, and the determiner 132 determines that the lane mark RL deviates toward the inner side or in the same direction as the traveling direction. After that, the action plan generator 140 sets the travel continuation distance of the host vehicle M in mode B to the first continuation distance when the determiner 132 determines that the width is larger than the vehicle width of the host vehicle M. This is because even if the length of the recognized lane mark RL is short, since the width is larger than the vehicle width of the host vehicle M, it is considered that there will be no problem with the host vehicle M to travel continuously in the driving mode of mode B for a certain distance. Alternatively, the action plan generator 140 may set the travel continuation distance to a value smaller than the first continuation distance and larger than the second continuation distance in consideration of the fact that the lane mark RL does not extend from the position of the host vehicle M to the front side of the preceding vehicle M1. In this way, the travel continuation distance can be set more finely according to the situation of the host vehicle M.

In any of the above patterns, the action plan generator 140 generates a target trajectory such that the host vehicle M follows the preceding vehicle M1, and the second controller 160 causes the host vehicle M to travel along the generated target trajectory. At that time, when the determiner 132 determines that there is a recognition error in only the lane mark RL on one side of the host vehicle M, the action plan generator 140 generates a target trajectory such that the host vehicle M follows the preceding vehicle M1 based on the lane mark RL on the other side where no recognition error has occurred. More specifically, the action plan generator 140 generates a target trajectory such that the host vehicle M follows the preceding vehicle M1 along the lane mark RL on the side where no recognition error has occurred.

FIG. 8 is a diagram for explaining a method in which the action plan generator 140 sets the travel continuation distance in the driving mode of mode B when the recognizer 130 has not recognized the preceding vehicle M1. As shown in FIG. 8, when the recognizer 130 has not recognized the preceding vehicle M1, the method of setting the travel continuation distance is classified into four patterns according to the determination result from the determiner 132. As in the case of FIG. 7, in each pattern, the travel continuation distance is uniquely set regardless of whether there is a recognition error in the lane marks RL on both sides or there is a recognition error in the lane mark RL on one side. Therefore, the case where there is a recognition error in the lane marks RL on both sides and the case where there is a recognition error in the lane mark RL on one side will be described together.

In pattern (e) of FIG. 8, the action plan generator 140 sets the travel continuation distance of the host vehicle M in mode B to a third continuation distance when the determiner 132 determines that there is an error in the second map information 62 and there is a recognition error in the lane mark RL, the recognizer 130 has not recognized the preceding vehicle M1 within the first predetermined distance D1 on the traveling direction side of the host vehicle M, and the determiner 132 determines that the recognized lane mark RL has a length of the second predetermined distance D2 or more from the host vehicle M in the traveling direction of the host vehicle M. At this time, the third continuation distance is a value smaller than the first continuation distance and equal to or smaller than the second continuation distance. That is, in pattern (e) of FIG. 8, since the preceding vehicle M1 is not recognized within the first predetermined distance D1 on the traveling direction side of the host vehicle M, even if the lane mark RL has a length of the second predetermined distance D2 or more and can be recognized accurately, the travel continuation distance of the host vehicle M in mode B is set short.

In pattern (f) of FIG. 8, the action plan generator 140 sets the travel continuation distance of the host vehicle M in mode B to the third continuation distance when the determiner 132 determines that there is an error in the second map information 62 and there is a recognition error in the lane mark RL, the recognizer 130 has not recognized the preceding vehicle M1 within the first predetermined distance D1 on the traveling direction side of the host vehicle M, the determiner 132 determines that the recognized lane mark RL does not have a length of the second predetermined distance D2 or more from the host vehicle M in the traveling direction of the host vehicle M, and the determiner 132 determines that the lane mark RL deviates toward the outer side. This is because, as in pattern (b) of FIG. 7, when the lane mark RL deviates toward the outer side, even if the length of the recognized lane mark RL is short, it is considered that there will be no problem with the host vehicle M traveling continuously in the driving mode of mode B for a certain distance.

In pattern (g) of FIG. 8, the mode determiner 150 stops the driving mode of mode B when the determiner 132 determines that there is an error in the second map information 62 and there is a recognition error in the lane mark RL, the recognizer 130 has not recognized the preceding vehicle M1 within the first predetermined distance D1 on the traveling direction side of the host vehicle M, the determiner 132 determines that the recognized lane mark RL does not have a length of the second predetermined distance D2 or more from the host vehicle M in the traveling direction of the host vehicle M, and the determiner 132 determines that the lane mark RL deviates toward the inner side or in the same direction as the traveling direction. This is because, in the case of pattern (g), the preceding vehicle M1 is not recognized within the first predetermined distance D1, the length of the recognized lane mark RL is short, and the width is decreasing or is not changing, there may be a problem with the host vehicle M traveling continuously in the driving mode of mode B.

In pattern (h) of FIG. 8, the determiner 132 determines whether the width of the lane mark RL is larger than the vehicle width of the host vehicle M when the determiner 132 determines that there is an error in the second map information 62 and there is a recognition error in the lane mark RL, the recognizer 130 has not recognized the preceding vehicle M1 within the first predetermined distance D1 on the traveling direction side of the host vehicle M, the determiner 132 determines that the lane mark RL does not have a length of the second predetermined distance D2 or more from the host vehicle M in the traveling direction of the host vehicle M, and the determiner 132 determines that the lane mark RL deviates toward the inner side or in the same direction as the traveling direction. After that, the action plan generator 140 sets the travel continuation distance in the driving mode of mode B to the third continuation distance when the determiner 132 determines that the width is larger than the vehicle width of the host vehicle M. This is because, as in pattern (d) of FIG. 7, even if the length of the recognized lane mark RL is short, since the width is larger than the vehicle width of the host vehicle M, it is considered that there will be no problem with the host vehicle M to travel continuously in the driving mode of mode B for a certain distance.

[Operation Flow]

Next, with reference to FIGS. 9 to 11, the flow of operations executed by the vehicle control device according to the present embodiment will be described. FIG. 9 is a flowchart showing an example of the flow of operations executed by the vehicle control device according to the present embodiment. The processing of this flowchart is executed in a predetermined control cycle while the host vehicle M is traveling in the driving mode of mode B.

First, the recognizer 130 recognizes the surrounding situation of the host vehicle M including the lane mark RL (step S100). Next, the determiner 132 determines whether there is an error in the second map information 62 and there is a recognition error in the lane mark RL included in the surrounding situation based on the recognized surrounding situation and the second map information 62 (step S101). When it is determined that there is no recognition error in the lane mark RL, the vehicle control device ends the processing of this flowchart.

On the other hand, when it is determined that there is an error in the second map information 62 and there is a recognition error in the lane mark RL, the determiner 132 determines whether the recognizer 130 has recognized the preceding vehicle M1 within the first predetermined distance D1 on the traveling direction side of the host vehicle M (step S102). When the determiner 132 determines that the recognizer 130 has recognized the preceding vehicle M1 within the first predetermined distance D1 on the traveling direction side of the host vehicle M, the process proceeds to step S103, and the vehicle control device executes the process of S201, which will be described later (step S103). On the other hand, when the determiner 132 determines that the recognizer 130 has not recognized the preceding vehicle M1 within the first predetermined distance D1 on the traveling direction side of the host vehicle M, the process proceeds to step S104, and the vehicle control device executes the process of step S301, which will be described later (step S104).

Figure 10:
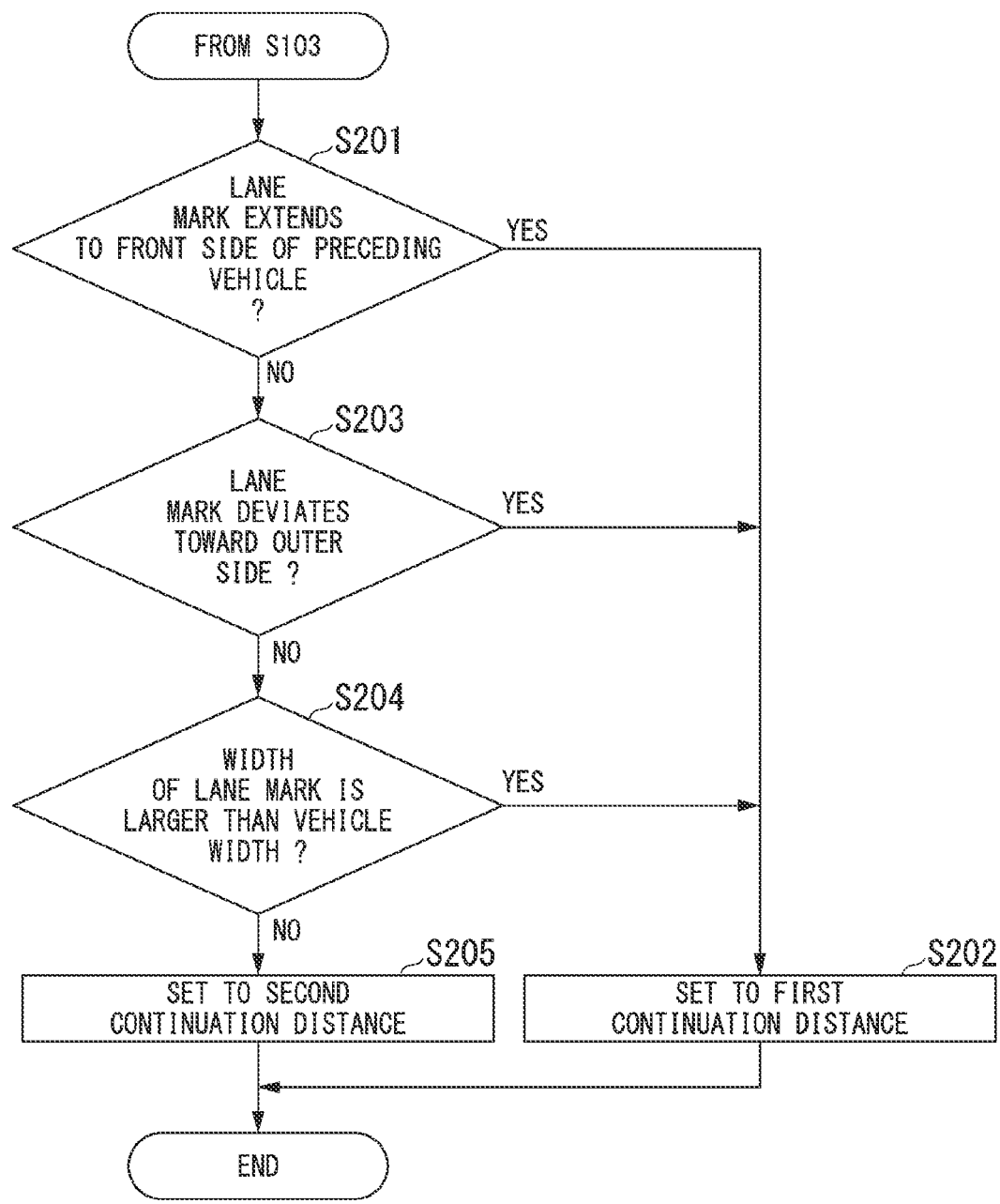
FIG. 10 is a flowchart showing an example of the flow of operations executed by the vehicle control device when the recognizer has recognized a preceding vehicle within a first predetermined distance on the traveling direction side of the host vehicle.

FIG. 10 is a flowchart showing an example of the flow of operations executed by the vehicle control device when the recognizer 130 has recognized the preceding vehicle M1 within the first predetermined distance D1 on the traveling direction side of the host vehicle M. First, the determiner 132 determines whether the lane mark RL extends from the position of the host vehicle M to the front side of the preceding vehicle M1 (step S201). When it is determined that the lane mark RL extends from the position of the host vehicle M to the front side of the preceding vehicle M1, the action plan generator 140 sets the travel continuation distance of the host vehicle M in mode B to the first continuation distance (step S202).

On the other hand, when it is determined that the lane mark RL does not extend from the position of the host vehicle M to the front side of the preceding vehicle M1, the determiner 132 determines whether the lane mark RL deviates toward the outer side (step S203). When it is determined that the lane mark RL deviates toward the outer side, the action plan generator 140 sets the travel continuation distance of the host vehicle M in mode B to the first continuation distance.

On the other hand, if it is determined that the lane mark RL does not deviate toward the outer side, that is, if it is determined that the lane mark RL deviates toward the inner side or in the same direction, the determiner 132 then determines whether the width of the lane mark RL is larger than the vehicle width of the host vehicle M (step S204). When it is determined that the width of the lane mark RL is larger than the vehicle width of the host vehicle M, the action plan generator 140 sets the travel continuation distance of the host vehicle M in mode B to the first continuation distance.

On the other hand, when it is determined that the width of the lane mark RL is not larger than the vehicle width of the host vehicle M, the action plan generator 140 sets the travel continuation distance of the host vehicle M in mode B to the second continuation distance (step S205). In this way, the processing of this flowchart ends.

Figure 11:
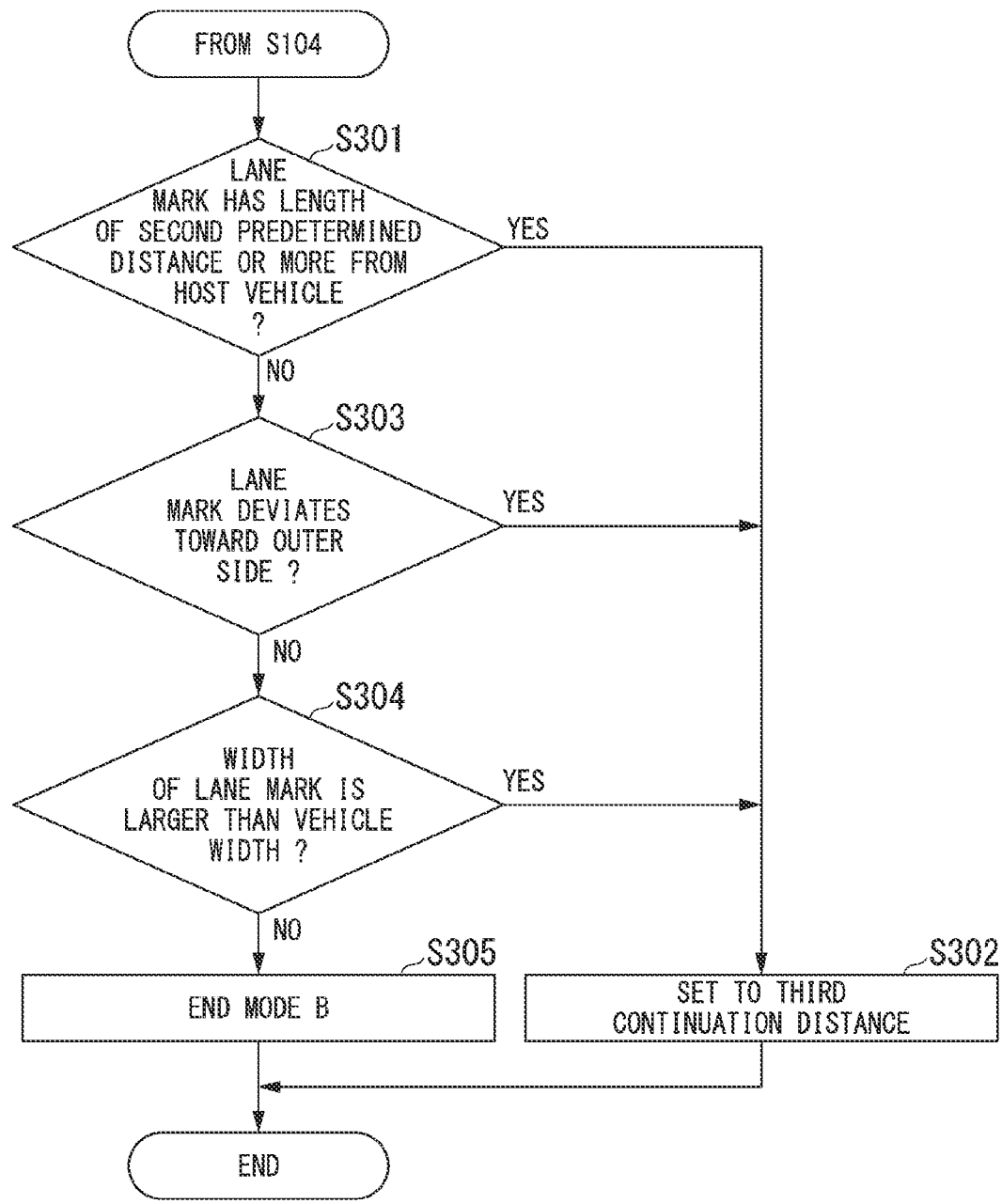
FIG. 11 is a flowchart showing an example of the flow of operations executed by the vehicle control device when the recognizer has not recognized a preceding vehicle within a first predetermined distance on the traveling direction side of the host vehicle.

FIG. 11 is a flowchart showing an example of the flow of operations executed by the vehicle control device when the recognizer 130 has not recognized the preceding vehicle M1 within the first predetermined distance D1 on the traveling direction side of the host vehicle M. First, the determiner 132 determines whether the lane mark RL has a length of the second predetermined distance D2 or more from the host vehicle M (step S301). When it is determined that the lane mark RL has a length of the second predetermined distance D2 or more from the host vehicle M, the action plan generator 140 sets the travel continuation distance of the host vehicle M in mode B to the third continuation distance (step S302).

On the other hand, if it is determined that the lane mark RL does not have a length of the second predetermined distance D2 or more from the host vehicle M, the determiner 132 then determines whether the lane mark RL deviates toward the outer side (step S303). When it is determined that the lane mark RL deviates toward the outer side, the action plan generator 140 sets the travel continuation distance of the host vehicle M in mode B to the third continuation distance.

On the other hand, if it is determined that the lane mark RL does not deviate toward the outer side, that is, if it is determined that the lane mark RL deviates toward the inner side or in the same direction, the determiner 132 then determines whether the width of the lane mark RL is larger than the vehicle width of the host vehicle M (step S304). When it is determined that the width of the lane mark RL is larger than the vehicle width of the host vehicle M, the action plan generator 140 sets the travel continuation distance of the host vehicle M in mode B to the third continuation distance.

On the other hand, when it is determined that the width of the lane mark RL is not larger than the vehicle width of the host vehicle M, the mode determiner 150 ends the driving mode of mode B (step 305). In this way, the processing of this flowchart ends.

According to the embodiment of the present invention described above, when the determiner 132 determines that there is a recognition error in the lane mark RL while the host vehicle M is traveling in mode B and the recognizer 130 has recognized the preceding vehicle within the first predetermined distance D1 or more on the traveling direction side of the host vehicle M, the driving controller sets the travel continuation distance in mode B to be longer than that when the preceding vehicle D1 is not recognized. As a result, it is possible to flexibly change the driving control even when the map information mounted in the vehicle is different from the recognized external information.

The above-described embodiments may be expressed as follows.

A vehicle control device comprising: a storage device that stores a program; and a hardware processor, wherein the hardware processor executes the program stored in the storage device to execute: recognizing a surrounding situation of a vehicle; controlling steering and acceleration/deceleration of the vehicle without depending on an operation of a driver of the vehicle based on the surrounding situation and map information; determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle; determining whether there is an error in the map information based on the surrounding situation and the map information and determining whether there is a recognition error in a lane mark included in the surrounding situation; and when it is determined that there is an error in the map information and there is a recognition error in the lane mark while the vehicle is traveling in the second driving mode, and a preceding vehicle is recognized within a first predetermined distance on a traveling direction side of the vehicle, setting a travel continuation distance in the second driving mode to be longer than that when the preceding vehicle is not recognized.

While modes for carrying out the present invention have been described using embodiments, the present invention is not limited to these embodiments, but various modifications and replacements can be made without departing from the spirit of the present invention.

What is claimed is:

1. A vehicle control device comprising:
a storage device that stores a program; and
a hardware processor, wherein
the hardware processor executes the program stored in the storage device to execute:
recognizing a surrounding situation of a vehicle;
controlling steering and acceleration/deceleration of the vehicle without depending on an operation of a driver of the vehicle based on the surrounding situation and map information stored in advance;
determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle;
determining whether there is an error in the map information stored in advance based on whether the surrounding situation and the map information stored in advance match each other and determining whether there is a recognition error in a lane mark included in the surrounding situation based on a degree of parallelism of the lane mark; and
when it is determined that there is an error in the map information stored in advance and there is a recognition error in the lane mark while the vehicle is traveling in the second driving mode, and a preceding vehicle is recognized within a first predetermined distance on a traveling direction side of the vehicle, setting a travel continuation distance in the second driving mode to be longer than that when the preceding vehicle is not recognized,
wherein the second driving mode is a driving mode in which the driver is not assigned a task of gripping a steering wheel of the other vehicle.

2. The vehicle control device according to claim 1, wherein
the hardware processor executes:
determining whether there is a recognition error in lane marks on both sides of the vehicle or there is a recognition error in the lane mark on one side of the vehicle when it is determined that there is a recognition error in the lane mark.

3. The vehicle control device according to claim 2, wherein
the hardware processor executes:
when it is determined that there is a recognition error in the lane mark and the preceding vehicle is recognized within a first predetermined distance on the traveling direction side of the vehicle, determining whether there is a recognition error in lane marks on both sides of the vehicle or there is a recognition error in the lane mark on one side of the vehicle based on a degree of parallelism between the lane mark and a traveling trajectory of the preceding vehicle.

4. The vehicle control device according to claim 2, wherein
the hardware processor executes:
when it is determined that there is a recognition error in the lane mark, determining whether the lane marks on both sides or the lane mark on one side deviate(s) toward an outer side or an inner side with respect to the traveling direction of the vehicle or deviate(s) in the same direction as the traveling direction.

5. The vehicle control device according to claim 1, wherein
the hardware processor executes:
when it is determined that there is a recognition error in the lane mark and the preceding vehicle is recognized within the first predetermined distance on the traveling direction side of the vehicle, determining whether the lane mark extends from a position of the vehicle to a front side of the preceding vehicle.

6. The vehicle control device according to claim 1, wherein
the hardware processor executes:
when it is determined that there is a recognition error in the lane mark and a preceding vehicle within a first predetermined distance on a traveling direction side of the vehicle is not recognized, determining whether the lane mark has a length of a second predetermined distance or more from the vehicle in a traveling direction of the vehicle.

7. The vehicle control device according to claim 1, wherein
the hardware processor executes:
when it is determined that there is a recognition error in the lane mark while the vehicle is traveling in the second driving mode and the preceding vehicle is recognized within the first predetermined distance on the traveling direction side of the vehicle, causing the vehicle to follow the preceding vehicle based on a traveling trajectory of the preceding vehicle.

8. The vehicle control device according to claim 5, wherein
the hardware processor executes:
when it is determined that there is an error in the map information and there is a recognition error in the lane mark, the preceding vehicle is recognized within the first predetermined distance on the traveling direction side of the vehicle, and it is determined that the lane mark extends from a position of the vehicle to a front side of the preceding vehicle, setting the travel continuation distance in the second driving mode to the first continuation distance.

9. The vehicle control device according to claim 5, wherein
the hardware processor executes:
when it is determined that there is an error in the map information and there is a recognition error in the lane mark, the preceding vehicle is recognized within the first predetermined distance on the traveling direction side of the vehicle, it is determined that the lane mark does not extend from a position of the vehicle to a front side of the preceding vehicle, and it is determined that the lane mark deviates toward an outer side, setting the travel continuation distance in the second driving mode to the first continuation distance.

10. The vehicle control device according to claim 5, wherein
the hardware processor executes:
when it is determined that there is an error in the map information and there is a recognition error in the lane mark, the preceding vehicle is recognized within the first predetermined distance on the traveling direction side of the vehicle, it is determined that the lane mark does not extend from a position of the vehicle to the front side of the preceding vehicle, and it is determined that the lane mark deviates toward the inner side or deviates in the same direction, setting the travel continuation distance in the second driving mode to a second continuation distance.

11. The vehicle control device according to claim 10, wherein
the hardware processor executes:
when it is determined that there is an error in the map information and there is a recognition error in the lane mark, the preceding vehicle is recognized within the first predetermined distance on the traveling direction side of the vehicle, it is determined that the lane mark does not extend from a position of the vehicle to the front side of the preceding vehicle, and it is determined that the lane mark deviates toward the inner side or deviates in the same direction, determining whether a width of the lane mark is larger than a vehicle width of the vehicle and setting the travel continuation distance in the second driving mode to the first continuation distance when it is determined that the width is larger than the vehicle width.

12. The vehicle control device according to claim 6, wherein
the hardware processor executes:
when it is determined that there is an error in the map information and there is a recognition error in the lane mark, the preceding vehicle within the first predetermined distance on a traveling direction side of the vehicle is not recognized, and it is determined that the lane mark has the length of the second predetermined distance or more from the vehicle, setting the travel continuation distance in the second driving mode to a third continuation distance in the traveling direction of the vehicle.

13. The vehicle control device according to claim 6, wherein
the hardware processor executes:
when it is determined that there is an error in the map information and there is a recognition error in the lane mark, the preceding vehicle within the first predetermined distance on a traveling direction side of the vehicle is not recognized, it is determined that the lane mark does not have the length of the second predetermined distance or more from the vehicle, and it is determined that the lane mark deviates toward the outer side, setting the travel continuation distance in the second driving mode to the third continuation distance in the traveling direction of the vehicle.

14. The vehicle control device according to claim 6, wherein
the hardware processor executes:
when it is determined that there is an error in the map information and there is a recognition error in the lane mark, the preceding vehicle within the first predetermined distance on a traveling direction side of the vehicle is not recognized, it is determined that the lane mark does not have the length of the second predetermined distance or more from the vehicle, and it is determined that the lane mark deviates toward the inner side or in the same direction, setting the travel continuation distance in the second driving mode to the first continuation distance in the traveling direction of the vehicle.

15. The vehicle control device according to claim 14, wherein
the hardware processor executes:
when it is determined that there is an error in the map information and there is a recognition error in the lane mark, the preceding vehicle within the first predetermined distance on a traveling direction side of the vehicle is not recognized, a recognition error in the lane mark on one side of the vehicle or more from the vehicle, and it is determined that the lane mark deviates toward the inner side or in the same direction, determining whether the width of the lane mark is larger than a vehicle width of the vehicle, and setting the travel continuation distance in the second driving mode to the third continuation distance when it is determined that the width is larger than the vehicle width in the traveling direction of the vehicle.

16. A vehicle control method for causing a computer to execute:
recognizing a surrounding situation of a vehicle;
controlling steering and acceleration/deceleration of the vehicle without depending on an operation of a driver of the vehicle based on the surrounding situation and map information stored in advance;
determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle;
determining whether there is an error in the map information stored in advance based on whether the surrounding situation and the map information stored in advance match each other and determining whether there is a recognition error in a lane mark included in the surrounding situation based on a degree of parallelism of the lane mark; and when it is determined that there is an error in the map information stored in advance and there is a recognition error in the lane mark while the vehicle is traveling in the second driving mode, and a preceding vehicle is recognized within a first predetermined distance on a traveling direction side of the vehicle, setting a travel continuation distance in the second driving mode to be longer than that when the preceding vehicle is not recognized, wherein the second driving mode is a driving mode in which the driver is not assigned a task of gripping a steering wheel of the vehicle.

17. A computer-readable non-transitory storage medium storing a program for causing a computer to execute:

recognizing a surrounding situation of a vehicle;

controlling steering and acceleration/deceleration of the vehicle without depending on an operation of a driver of the vehicle based on the surrounding situation and map information stored in advance;

determining any one of a plurality of driving modes including a first driving mode and a second driving mode as a driving mode of the vehicle, and changing the driving mode of the vehicle to a driving mode in which the task is heavier when a task associated with the determined driving mode is not executed by the driver, the second driving mode being a driving mode in which a task assigned to the driver is lighter than that of the first driving mode, some of the plurality of driving modes including at least the second driving mode being performed by controlling the steering and the acceleration/deceleration of the vehicle without depending on the operation of the driver of the vehicle;

determining whether there is an error in the map information stored in advance based on whether the surrounding situation and the map information stored in advance match each other and determining whether there is a recognition error in a lane mark included in the surrounding situation based on a degree of parallelism of the lane mark; and when it is determined that there is an error in the map information stored in advance and there is a recognition error in the lane mark while the vehicle is traveling in the second driving mode, and a preceding vehicle is recognized within a first predetermined distance on a traveling direction side of the vehicle, setting a travel continuation distance in the second driving mode to be longer than that when the preceding vehicle is not recognized, wherein the second driving mode is a driving mode in which the driver is not assigned a task of gripping a steering wheel of the vehicle.

\* \* \* \* \*